US007822071B2

(12) United States Patent
DeCusatis

(10) Patent No.: US 7,822,071 B2
(45) Date of Patent: Oct. 26, 2010

(54) METHOD AND SYSTEM TO ENABLE THE TRANSPORT OF SYSPLEX TIMER PROTOCOLS OVER GENERIC FRAME PROCEDURE NETWORKS

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 11/468,345

(22) Filed: Aug. 30, 2006

(65) Prior Publication Data

US 2008/0056307 A1 Mar. 6, 2008

(51) Int. Cl.
*H04J 3/06* (2006.01)

(52) U.S. Cl. ....................... 370/509; 370/510; 370/512; 370/514

(58) Field of Classification Search ................. 370/324, 370/350, 395.62, 507, 509–514, 498, 503–520
See application file for complete search history.

(56) References Cited

U.S. PATENT DOCUMENTS 5,893,024 A * 4/1999 Sanders et al. .............. 725/125
6,249,800 B1 6/2001 Aman et al.
7,007,276 B1 2/2006 Kubala et al.
2002/0083190 A1 6/2002 Kamiya et al.
2002/0159484 A1* 10/2002 Azizoglu et al. ............ 370/522
2003/0227913 A1* 12/2003 Hallman et al. ............. 370/374
2005/0002338 A1 1/2005 Devdas et al.
2005/0013313 A1 1/2005 Liao et al.
2005/0028022 A1 2/2005 Amano
2005/0053064 A1 3/2005 Wang
2005/0135465 A1* 6/2005 Andrus et al. ............... 375/220
2006/0041826 A1 2/2006 Bhattacharya et al.
2006/1003702 2/2006 Carlson et al.

OTHER PUBLICATIONS

ITU-T, Recommendation G.7041/Y.1303: Generic Framing Procedure (GFP), Dec. 2001.*

Hernandez-Valencia, E., Scholten, M., Zhenyu Zhu. The Generic Framing Procedure (GFP): An Overview. May 2002. IEEE Communications Magazine, vol. 40, Issue 5, pp. 96-103.*

* cited by examiner

*Primary Examiner*—William Trost, IV
*Assistant Examiner*—Ashil Farahmand
(74) *Attorney, Agent, or Firm*—Scully, Scott, Murphy & Presser, P.C.; John E. Campbell

(57) ABSTRACT

Disclosed are a method of and system for enabling the transport of timer protocols over a generic frame procedure (GFP) network. The method comprises the steps of transmitting a defined optical initialization sequence to a GFP mapper, and using that GFP mapper to detect the optical initialization sequence and to generate a specified GFP frame to represent the initialization sequence. This specified GFP frame is recognized as a control frame for timer initialization. In a preferred embodiment, the timer protocol uses biphase encoding to encode clock data, and the method comprises the further steps of recovering clock data from a data stream that uses the biphase encoding, detecting a clock rate in that data stream, and using a look up table to map said detected clock rate into a specific code for said control frame.

19 Claims, 9 Drawing Sheets

110
SYSTEM C
SERVER 6
SERVER 7
SERVER 8
SERVER 9
$115_6$
$115_7$
$115_8$
$115_9$
$110_C$
SYSTEM D
SERVER 10
SERVER 11
$115_{10}$
$115_{11}$
$110_D$
125
130
SHARED DATA
POLICY INFO
135
120
SYSTEM A
SERVER 1
SERVER 2
SERVER 3
$115_1$
$115_2$
$115_3$
$110_A$
ROUTING NODE
SYSTEM E
SERVER 12
$115_{12}$
ROUTER
140
$110_E$
SYSTEM B
SERVER 4
SERVER 5
$115_4$
$115_5$
$110_B$
SYSPLEX
100
40
NETWORK 30
20
10
$10_1$
$15_1$
CLIENT
COMPUTER
CLIENT APPLICATION (DB2)
$10_n$
$15_n$
. . .

THE GFP CORE HEADER CONSISTS OF A TWO-OCTET-LENGTH FIELD AND A CRC-16 ERROR CHECK CODE OVER THIS FIELD.

WITH GFP-T, THE CLIENT 8B/10B CODES ARE DECODED INTO CONTROL CODES AND 8-bit DATA VALUES. EIGHT OF THESE DECODED CHARACTERS ARE THEN MAPPED INTO THE EIGHT PAYLOAD bytes OF A 64B/65B CODE.

The superblock structure concatenates the payload bytes in order, then takes the leading Flag bits of the eight constituent 64B/65B codes and groups them into a trailing byte.

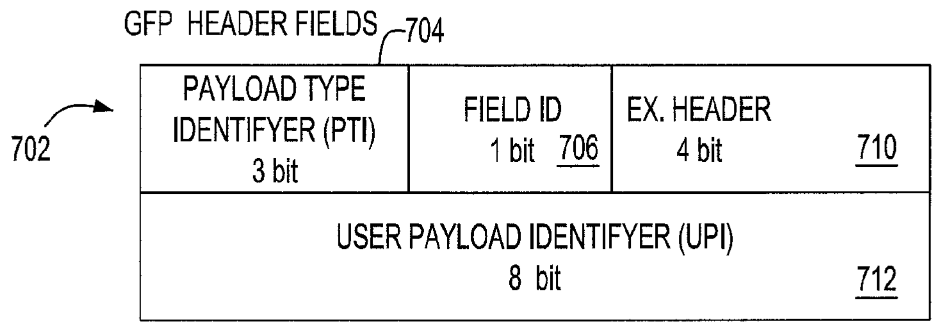

PTI = 000 FOR USER DATA (USE THIS FOR SYSPLEX TIMER)
PTI = 100 FOR USER MANAGEMENT

WHEN SENDING DATA, UPI = 0000 0000 THROUGH 0001 1111
TO REPRESENT SYSPLEX TIMER CHANNELS WITH CLOCK STEERING +/- 25 ppm WHEN SENDING NANAGEMENT INFORMATION,
UPI = 0000 0001 FOR CLIENT SIGNAL FAILURE, LOSS OF SIGNAL
UPI = 0000 0010 FOR CLIENT SIGNAL FAILURE, LOSS OF SYNC.

FIG. 7

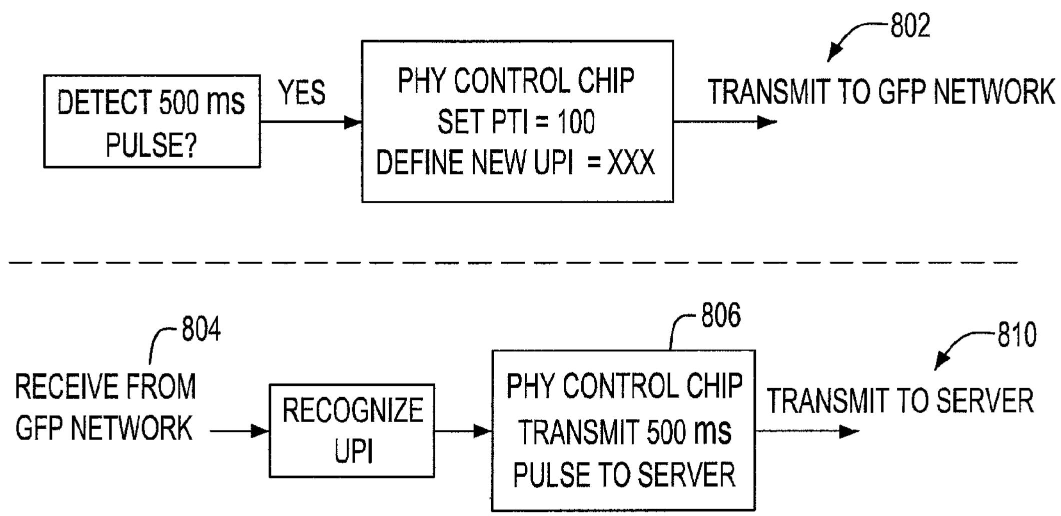

SIMILAR OPERATION IN REVERSE ORDER PROPAGATES 9037 LINK INITIALIZATION

FIG. 8

OUTPUT FROM GFP NETWROK: GENERATE UNRECOGNIZED 8/10 CHARACTERS AND FORCE LOSS OF SYNC ON SERVER. IF CONDITION PERSISTS FOR > 1 MEGA-MICROSECOND, ASSUME LOSS OF SIGNAL; RESET UPI = LOSS OF LIGHT, DROP LIGHT TO CLIENT SIDE INTERFACES.

AFTER 10 CONSECUTIVE CHARACTERS, MAY INSERT/DELETE ANY NEUTRAL DISPARITY ERROR CHARACTER

METHOD AND SYSTEM TO ENABLE THE TRANSPORT OF SYSPLEX TIMER PROTOCOLS OVER GENERIC FRAME PROCEDURE NETWORKS

BACKGROUND OF THE INVENTION

1. Field of the Invention

This invention generally relates to transporting timer protocols over a network using the Generic Frame Procedure. More specifically, the invention relates to an architecture and a procedure well suited to enable the transport of Sysplex Timer protocols over Generic Frame Procedure networks.

2. Background Art

Over the past several years and continuing to the present, computer manufacturers are providing processing architectures based on a multi-system shared data approach. Through these architectures, multiple large-scale computer systems, each of which is often referred to as a computer processing complex (CPC) or a central electronic complex (CEC), are interconnected, through, for example, a coupling facility or other inter-processor communication mechanism, to permit each such system to gain read-write access to data residing on one or more shared input/output devices, such as a direct access storage device (DASD). The resulting inter-connected computer system is commonly referred to as a "sysplex". In a sysplex, as with a typical multi-processing environment, a processing workload is generally distributed among all of the inter-connected computer systems such that each computer system is responsible for processing a portion of the entire workload. Owing to the inherent high reliability and highly cost-efficient expansion potential of a sysplex architecture, sysplexes are particularly attractive in handling so-called critical business support applications that involve real-time transaction processing and can tolerate essentially no downtime.

Certain currently available machines that can be readily incorporated into a sysplex, such as illustratively the Enterprise System/9000 (ES/9000) Series manufactured by the International Business Machines (IBM) Corporation, can each support, if appropriately configured, multiple actively and simultaneously executing copies of various operating systems (OS) to implement separate corresponding individual and unique application processing environments. (Enterprise System/9000 is a registered trademark, and ES/9000 is a trademark, of IBM Corporation)

Sysplexes, and other networks, may employ various technologies for transmitting data within the sysplex or network. For example, one technology, which has been in use for some time in telecommunication networks, but has only begun to find emerging applications in sysplex communications is referred to as SONET/SDH. SONET/SDH, which is an acronym for Synchronous Optical Network/Synchronous Digital Hierarchy, is a set of related standards for synchronous data transmission over fiber optic networks. SONET/SDH is currently used in wide area networks (WAN) and metropolitan area networks (MAN). A SONET system is comprised of switches, multiplexers, and repeaters, all connected by fiber. The connection between a source and destination is called a path.

More recently, the International Telecommunications Union (ITU) has proposed a new industry standard G.704.1 called Generic Frame Procedure (GFP). This is intended to allow standard datacom protocols such as ESCON or FICON to be encapsulated into a SONET/SDH compliant frame structure, so they can be transported across installed SONET networks. Since there is a large amount of SONET infrastructure installed by telecom carriers and other service providers, GFP is seen as the means for allowing enterprise systems to carry data traffic over existing SONET networks at very low incremental cost. In turn, this enables channel extensions over hundreds of kilometers for disaster recovery applications, such as large storage area networks. In order to remain competitive in the telecom carrier market, many wavelength division multiplexing (WDM) equipment manufacturers are adopting GFP transport.

Many networks, however, are not fully compatible with GFP. For example, in a Sysplex, timing data, referred to as Sysplex Timer links, cannot be readily transported over GFP at the present time.

SUMMARY OF THE INVENTION

An object of this invention is to facilitate the use of the Generic Frame Procedure (GFP) on a Sysplex.

Another object of the present invention is to provide the algorithms and frame structure required to encapsulate Sysplex Timer channels into GFP frames.

A further object of the invention is to enable link initialization in a Sysplex employing SONET/SDH technology, in a manner that is compatible with a GFP structure.

These and other objectives are attained with a method of and system for enabling the transport of timer protocols over a generic frame procedure (GFP) network. The method comprises the steps of transmitting a defined optical initialization sequence to a GFP mapper, and using that GFP mapper to detect the optical initialization sequence and to generate a specified GFP frame to represent the initialization sequence. This specified GFP frame is recognized as a control frame for timer initialization.

In a preferred embodiment, the timer protocol uses biphase encoding to encode clock data, and the method comprises the further steps of recovering clock data from a data stream that uses the biphase encoding, detecting a clock rate in that data stream, and using a look up table to map said detected clock rate into a specific code for said control frame. Also, preferably a defined GFP frame is used to designate a change in the clock rate. More specifically, this defined GFP frame is transmitted to a recipient GFP mapper, and this recipient mapper uses a look up table to determine a desired clock frequency based on said defined GFP frame.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 7 shows the GFP Header Fields that may be used in the present invention.

FIG. 8 depicts a procedure for recognizing a control frame for timer initialization.

DETAILED DESCRIPTION OF THE PREFERRED EMBODIMENTS

This invention generally relates to transporting timer protocols over a network using a defined frame procedure. As will be understood by those of ordinary skill in the art, the present invention can be used in computer installations that have any of a wide variety of different multi-server and/or multi-processing architectures. For example, the invention may be used in a sysplex that employs multiple computer processing complexes (CPCs), i.e., multiple physical processors, in which each CPC usually concurrently executes multiple applications against multiple operating system images. As a more specific example, the instant invention will be described in the context of a sysplex such as the ES/9000 Series computer that has separate systems all capable of accessing shared data. This sysplex and its components are manufactured by the International Business Machines Corporation of Armonk, N.Y.

Figure 1:
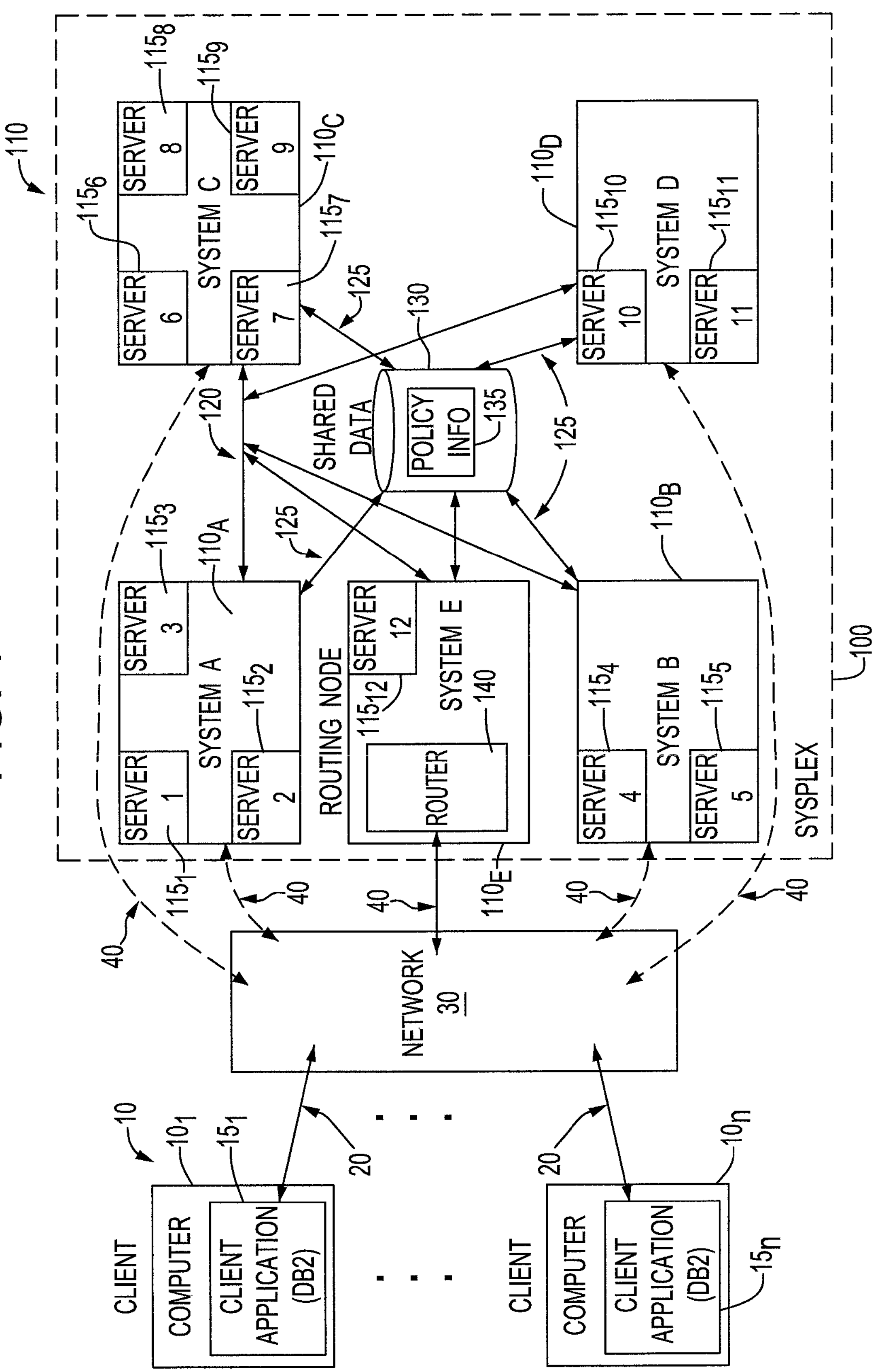
FIG. 1 shows a sysplex with which the present invention may be used.

FIG. 1 depicts a typical sysplex 100 and a typical associated networked computing environment. As shown, remote client computers 10, having client computers $\mathbf{10}_1, \ldots, \mathbf{10}_n$, are connected through connections 20, network 30, and connections 40, to sysplex 100, and specifically through the network (not shown) to any of systems 110 residing within the sysplex. Illustratively, client computers $\mathbf{10}_1, \ldots, \mathbf{10}_n$ execute respective client applications $\mathbf{15}_1, \ldots, \mathbf{15}_n$; for simplicity, one such application, e.g., a DB2 database application, is shown as executing at each client computer, though, in actuality, each client computer can simultaneously execute different client applications and/or conduct multiple sessions of the same application. Those skilled in the art realize that a "session" is an example of a connection between two endpoints, e.g. a client and a server. Hence, the term "session" will be used in that generic context hereinafter. To simplify the drawing, the sysplex is shown as containing merely five systems: $\mathbf{110}_A$, $\mathbf{110}_B$, $\mathbf{110}_C$, $\mathbf{110}_D$ and $\mathbf{110}_E$ (also designated as SYSTEM A, SYSTEM B, SYSTEM C, SYSTEM D and SYSTEM E, respectively).

Each system 110 implements a separate corresponding and unique application-processing environment. Each of these environments utilizes a separate copy of an OS, such as the MVS OS, which forms a so-called OS "image", along with an instance(s) of corresponding application program(s) and a dedicated storage area (typically a logical partition—"LPAR"); the OS and LPAR are not specifically shown in the figure. Each application instance that executes on any such system constitutes a separate application server (henceforth referred to as simply a "server" or "real instance") to service a portion of the total workload presented to the overall application (also referred to as the "generic resource") on the sysplex. A system, based on its processing capacity and that required by the corresponding applications, can implement multiple corresponding servers.

Shared data device 130 provides common data accessible among the systems 110. To the extent relevant here, device 130 stores policy information in dataset 135 that is commonly accessible by all the systems. The shared data device communicates with each of the systems 110 as symbolized by paths 125. The shared data device may be implemented by illustratively a coupling facility or a direct access storage device (DASD). The servers, coupling facilities, DASD, and other elements of a sysplex may be geographically distributed across distances of hundreds of km or more. In order to perform synchronous disaster recovery operations at these distances, the Sysplex Timer signal must be distributed to all the servers in such a sysplex In the preferred embodiment, sysplex 100 employs SONET/SDH technologies, which are a set of related standards for synchronous data transmission over fiber optic networks.

As mentioned above, recently the International Telecommunications Union (ITU) has recently proposed a new industry standard G.704.1 called Generic Frame Procedure (GFP). This is intended to allow standard datacom protocols such as ESCON or FICON to be encapsulated into a SONET/SDH compliant frame structure, so they can be transported across installed SONET networks. Since there is a large amount of SONET infrastructure installed by telecom carriers and other service providers, GFP is seen as the means for allowing enterprise systems to carry data traffic over existing SONET networks at very low incremental cost. In turn, this enables channel extensions over hundreds of kilometers for disaster recovery applications, such as large storage area networks. In order to remain competitive in the telecom carrier market, many wavelength division multiplexing (WDM) equipment manufacturers are adopting GFP transport.

Generally, the present invention provides the algorithms and frame structure required to encapsulate Sysplex Timer channels into GFP frames. Since ETR and CLO links have similar requirements at the physical layer, both protocols are herein treated together.

A specific example of a device which provides timing information is the IBM 9037 Sysplex Timer, manufactured by IBM Corporation of Armonk, N.Y. (the name Sysplex Timer is a registered trademark of IBM Corporation). This product provides a time-of-day reference clock signal to all servers in a sysplex, allowing for the synchronous processing of transactions by multiple CPCs or LPARs. The signal which is transmitted from a Sysplex Timer to a CPC is known as an External Time Reference (ETR) signal. In many applications, two Sysplex Timers are required for redundancy; in this case, the two devices must communicate with each other in order to remain synchronized to the same time-of-day. The communication links between a pair of timers in a sysplex are known as Control Link Oscillator (CLO) signals. This invention is concerned with the transmission of both ETR and CLO signals over a SONET/SDH network using GFP. This is required because a sysplex may be constructed to extend across multiple geographic locations, such that the servers and other sysplex building blocks are geographically distributed to provide redundancy and recovery in the case of natural or man-made disasters. In this manner, a sysplex is used to provide business continuity and disaster recovery for critical business applications. In order to perform synchronous processing operations in such a geographically distributed parallel sysplex (GDPS) environment, it is necessary for the ETR and CLO signals to be extended over distances of perhaps 100 km or more. This is facilitated by the current invention, which enables the transport of these signals over existing SONET/SDH networks using GFP (which may already be used to carry other types of data traffic within a sysplex).

The basic GFP procedure for protocols such as ESCON involves decoding each character of an 8B/10B data sequence, and mapping the result into either an 8-bit data character or a recognized control character. This data is then re-encoded as a 64B/65B word, with control characters mapped into a pre-determined set of control words. A group of 8 such words is assembled into an octet, which is provided with additional control and error flags. A group of 8 octets is then assembled into a "superblock", scrambled, and a CRC error check field is added. The resulting frames are compliant with routing through a SONET/SDH network flow control, including quality of service and related features; the original 8B/10B encoded data is reassembled at the other end of the network. Specifically, the payload header of a GFP frame contains a mandatory two-octet field, which specifies the content and format of the GFP frame payload. This includes a 3-bit subfield called the Payload Type Identifier (PTI); when PTI is set to 100, the GFP mapper recognizes the payload as management information rather than client data. Once the frame is identified as containing management information, an 8-bit field called User Payload Identification (UPI) may be set.

Figure 2:
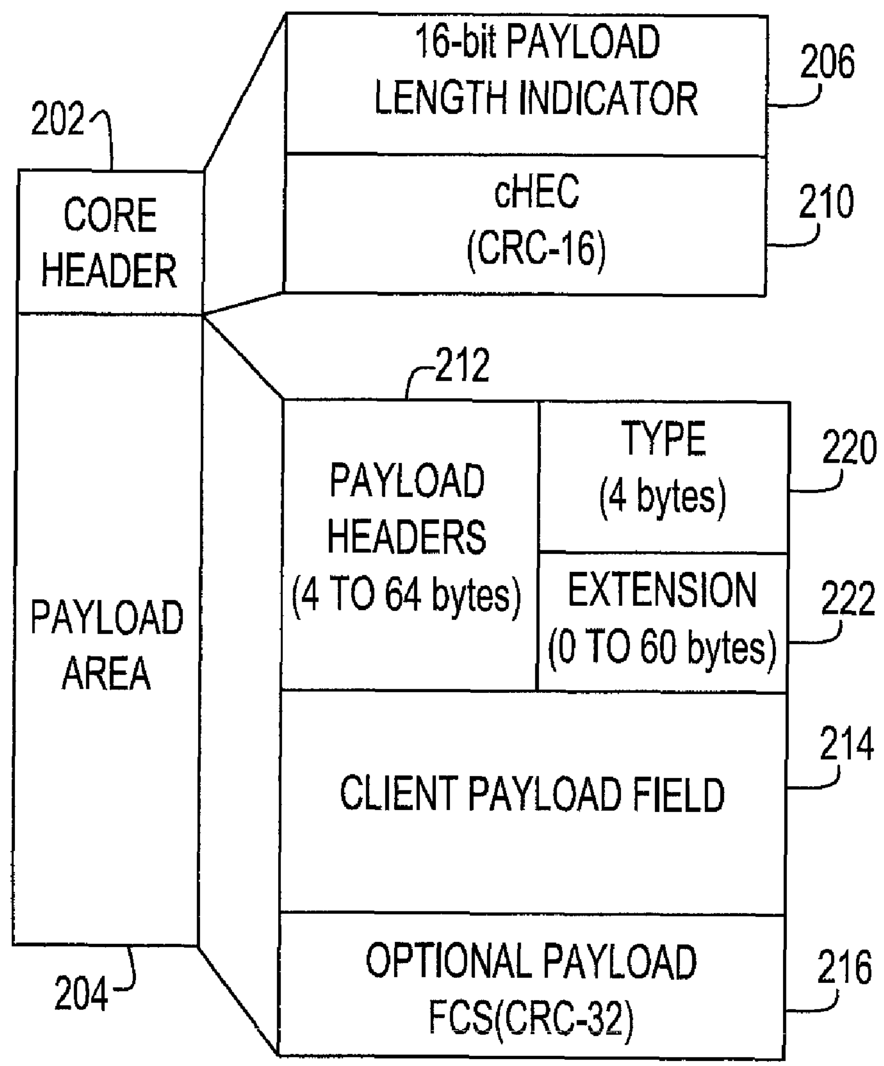
FIG. 2 is a diagram of a GFP frame.

FIG. 2 illustrates the fields of a GFP frame. The two basic parts of the frame are the core header 202 (4 bytes) and the payload area 204 (variable length up to 65535 bytes). The core header 202 includes a payload length indicator 206 (PLI, 2 bytes) and the core header error correction (cHEC) code 210 (2 bytes). The payload area 204 includes the payload header 212 (4 to 64 bytes), the payload information field 214 (up to 65531 bytes), and an optional payload FCS 216 (4 bytes). The payload header includes the type 220 (4 bytes) and an extension header 222 identifier (0 to 60 bytes).

The present invention is concerned with GFP-T. As mentioned above GFP-T facilitates the transport of block-coded signals, which also require very low transmission latency. These signals are encoded by clients with an 8B/10B block code. This code is used to communicate data and control information. More particularly, the 8-bit data values are mapped (encoded) into a 10-bit "transmission character". The code assignment is arranged so that the number of 1s and 0s transmitted on the line remains balanced. This increases the number of line transitions, thereby facilitating PLL synchronization. It also maintains DC balance over time. In addition, twelve of the 10-bit codes are reserved for use as control codes so that the data source may signal the data sink.

Figure 3:
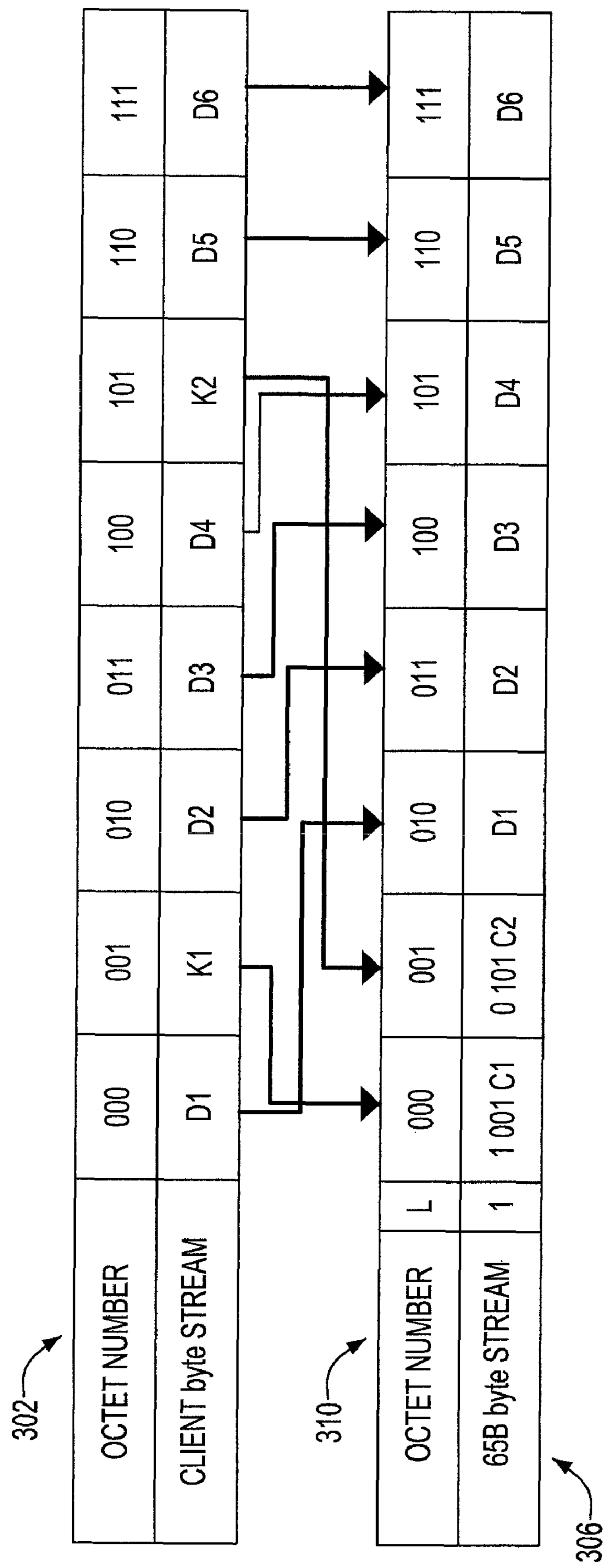
FIG. 3 illustrates the mapping of 8B/10B codes into a 64B/65B code.
Figure 4:
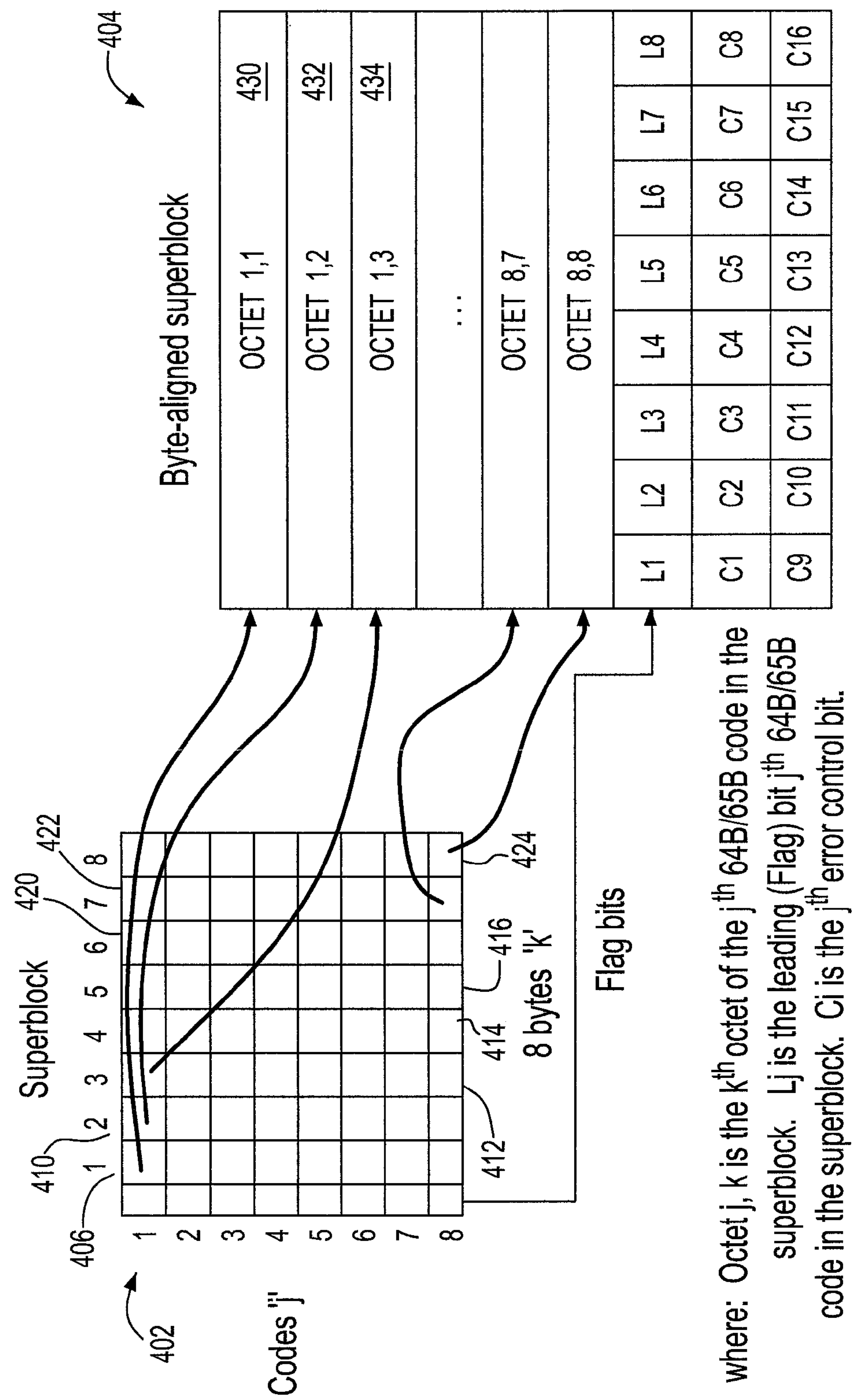
FIG. 4 shows the mapping of 64B/65B codes into a GFP-T superblock.

With reference to FIG. 3, in order to transport 8B/10B-encoded signals over the SONET/SDH network, GFP-T decodes the 8B/10B characters 302 into 8-bit data characters 306 and control codes 310. Eight of the decoded characters are mapped into the eight payload bytes of a 64B/65B code. This is shown by example in FIG. 3. The (leading) flag bits of the 64B/65B code (shown as octet L in FIG. 3) indicate whether the 64B/65B block includes any control codes, i.e. a flag=1 indicates that the octet in the corresponding position of the next eight octets is a control code. In a GFP-T frame, after the 4-byte payload header, the payload area is filled with a plurality of "superblocks". Each superblock includes eight 64B/65B blocks and one 16-bit CRC, i.e. 67 bytes. The last octet of the superblock before the CRC includes eight flag bits. This is often referred to as the "superblock control byte". FIG. 4 illustrates the mapping of the superblock. In particular, FIG. 4 shows a superblock 402 that is 402 that is mapped into a byte-aligned superblock 404. Superblock 402 includes eight smaller blocks 406, 410, 412, 414, 416, 420, 422 and 424. The first seven of these smaller blocks are mapped into outlets, three of which are represented at 430, 432 and 434.

In order to address the physical properties of the transport medium and to aid in maintaining synchronization, GFP frames are scrambled by a self-synchronous scrambler. The scrambler uses a polynomial of $x^{43}+1$. The scrambler takes each bit of the payload area (including the superblock CRC) and exclusively ORs it with the scrambler output bit that precedes it by 43 bit positions. The scrambler state is retained between successive GFP frames, making it more difficult for a user to purposely choose a malicious payload pattern (e.g. one which would cause loss of synchronization). The superblock CRC is calculated prior to scrambling and is checked at the decoder after descrambling. An unfortunate drawback of this scrambling technique is that each transmission error produces a pair of errors (43 bits apart) in the descrambled data stream. The CRC, therefore, must be able to correct these two errors. The recommended CRC generator polynomial generates a superblock CRC that can detect three bit errors, correct single bit errors, and correct double bit errors spaced 43 bits apart. To accomplish this, the syndromes for single bit errors and double bit errors spaced 43 bits apart are all unique.

When demapping a GFP-T signal, the superblock control byte must be "realigned" (the flag bits moved back to their original leading bit locations) before the 64B/65B code can be mapped back into 8B/10B code. Before this is done, the superblock CRC is used to detect and possibly correct bit errors in the superblock. The recommended demapping procedure is detailed in ITU specification G.7041, the complete disclosure of which is hereby incorporated herein by reference.

Figure 5:
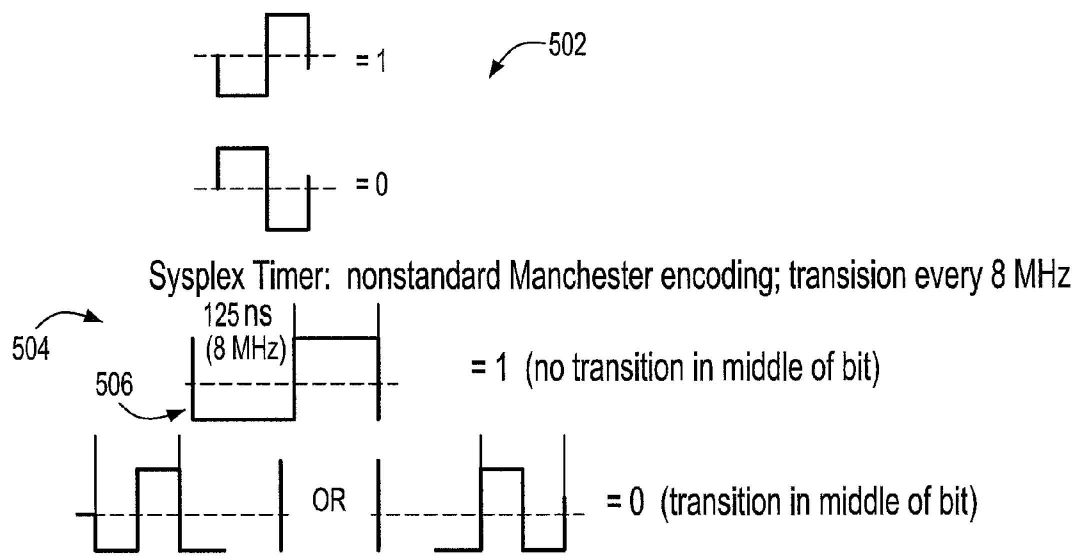
FIG. 5 illustrates an encoding procedure that may be used in the practice of the present invention.

There are a number of features unique to the Sysplex Timer, which must be addressed in order to make it compatible with a GFP structure. First, the timer does not use 8B/10B encoded data; rather, it uses a modified version of biphase or Manchester encoding. With reference to FIG. 5, standard Manchester encoding is illustrated at 502, in which a logical 1 or 0 is determined by the direction of the signal change, either from low to high, or from high to low. The Sysplex Timer uses a modification, illustrated at 504, in which a logical 1 or 0 is determined by whether or not a signal transition occurs in the middle of a 125 ns (8 Mhz) bit period 506. Second, the timer initializes its link by first launching a 500 ms long optical pulse which must be received and echoed back by a server at the other end of the link; the round trip latency of the link is measured by dividing this time in half, and this information is used to offset the launch of clock information to remote servers. Third, the timers can vary their 8 MHz data rate by +/−25 ppm in order to steer the clock and compensate for timing variations. All of these functions must be transparent to the GFP network.

Figure 6:
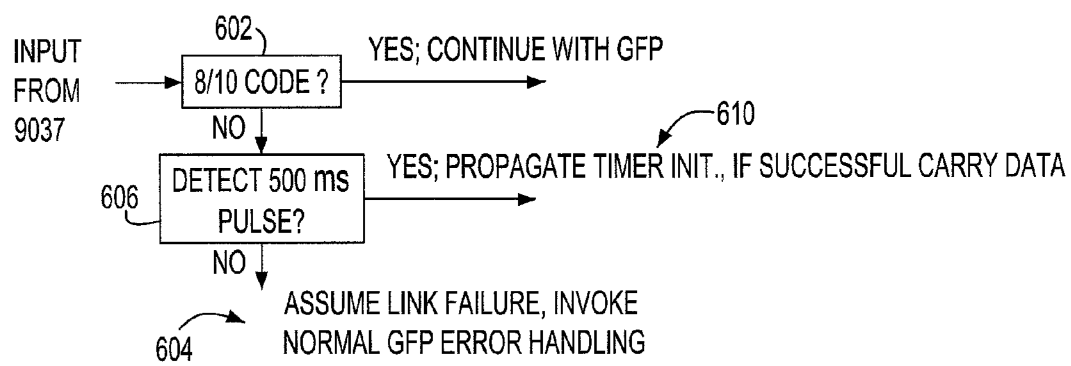
FIG. 6 shows a procedure to determine whether there is a link failure.

To address timer link initialization and related functions, new physical layer functions are added to the GFP interface; these functions can be enabled in hardware, or as microcode running at a lower level than the GFP mapper and de-mapper. The physical layer, or PHY, functions are not part of GFP at this time, and are required to control the laser driver in order to propagate link conditions specific to the Sysplex Timer. First, the problem of link initialization is addressed. A conventional GFP interface is designed only to detect 8B/10B encoded data, and would treat the timer initialization sequence or biphase-encoded data as errors. With the preferred embodiment of this invention, and as is illustrated in FIG. 6, if the input signal provided to the GFP mapper is, at 602, not recognized as 8B/10B data, before sending an error sequence 604, the input is checked, at 606, to determine whether it matches the timer initialization sequence (500 ms optical pulse with predetermined signal levels).

If the initialization pulse is detected, then at 610 it must be propagated across the GFP network. This can be done with the new physical layer control function mentioned earlier. With reference to FIGS. 7 and 8, the control function is used to generate a GFP frame 702, which is recognized as a control frame for timer initialization (for example, this may be done by setting PTI=100 and UPI=0000 1000). In particular, FIG. 7 shows GFP Frame 702 having a series of header fields including payload Type Identifier 704, field ID 706 and Ex. Header 710. Frame 702 also includes user Payload Identifiers 712. With reference to FIG. 8, this control frame is then sent to the GFP network, as represented at 802, and then propagated through the GFP network in the usual manner. Upon arriving at the receiver 804, a frame with this UPI would cause, at 806, the PHY control function to generate a 500 ms long optical pulse with the appropriate signal levels. This is received by the server or timer at the remote end of the link, at 810, and echoed back into the GFP network; reversing the process, the echo pulse returns to the original timer, which can then calculate an initial delay offset for the GFP network.

Figure 9:
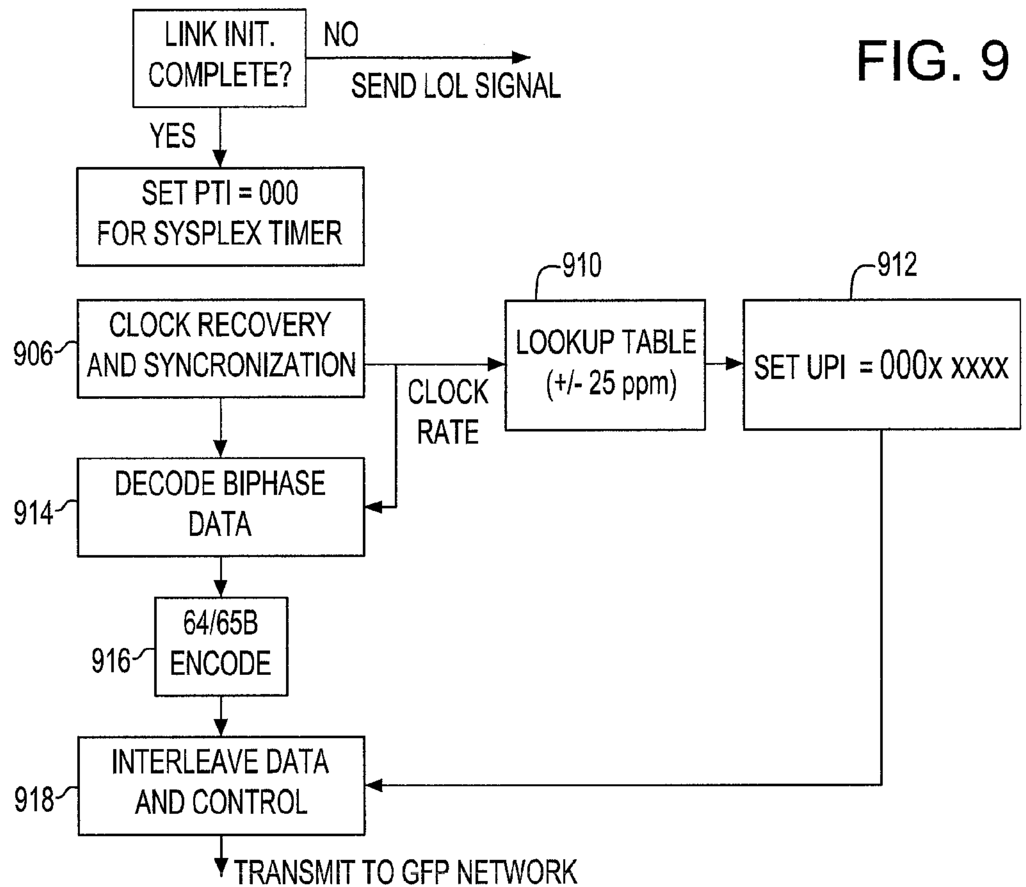
FIG. 9 shows a method for propagation of the timer's biphase encoded data.

Next, the invention addresses propagation of the timer's biphase encoded data, as well as clock steering functions. With reference to FIG. 9, once link initialization is completed successfully, preferably the invention sets PTI=000 and sets UPI=0000 1111 to designate sysplex timer data. A new function is provided at 906 running under the GFP mapper to recover a clock from the data stream, and to detect the clock rate to within 1 or 2 ppm. Once the clock rate is known, a lookup table is used at 910 to map the clock rate into a specific UPI code for the control frame at 912; for example, a clock rate of 8 MHz+1 ppm might be mapped into PTI=100, UPI=0000 0100, while a rate of 8 MHz-1 ppm might be mapped into PTI=100, UPI=000 0110. If the accuracy of the clock recovery is 1 ppm, then preferably, for example, 50 unique UPI codes are reserved corresponding to each of the possible data rates. Meanwhile, the recovered clock is used at 914 to decode the biphase timer data; the decoder contains information about the timer's proprietary biphase encoding as described earlier. The decoded bit stream is then remapped at 916 into a 64/65B code, and transmitted as part of a standard GFP data frame. The control frame containing the desired clock rate is transmitted before the data frame. Whenever the clock rate changes, a new control frame is inserted at 918 into the data stream before the beginning of the new data. This information is transmitted across the GFP network.

Figure 10:
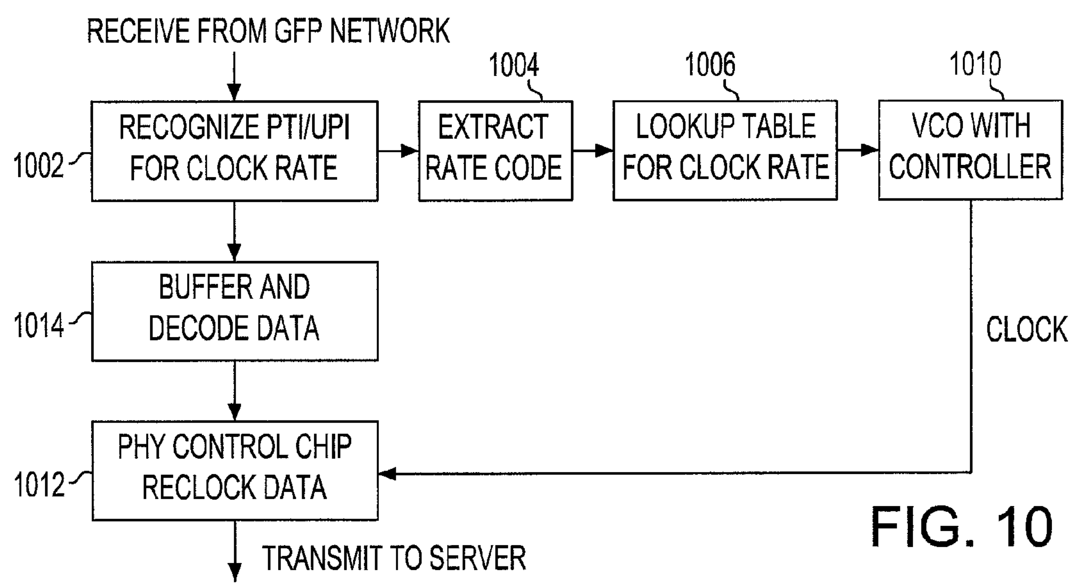
FIG. 10 illustrates a procedure for handling receipt of a control frame having timer control data.

At the receiver, the control frame arrives first (the timer links are provisioned with a quality of service that prevents out of order frames). With reference to FIG. 10, when the receiver at 1002 recognizes the control frame corresponding to a change in clock rate, then as represented at 1004 and 1006, it uses a lookup table to determine the desired clock frequency for the output data. As represented at 1010, a voltage-controlled oscillator with the desired accuracy is then used at 1012 to adjust the output clock to the appropriate rate. Any data frames received after the control frame are buffered at 1014 until the VCO has been tuned; this is not expected to cause a problem, since the timer operates at a very low data rate and tuning is expected to be infrequent. The GFP demapper contains the ability to decode the 64/65B data blocks back into the original biphase sequence; the PHY control function transmits this data to the remote server or timer using the appropriate clock rate. The timing jitter depends primarily on the quality of the local reference clock when this approach is used.

There are several related issues that are addressed to insure transparent signaling across a GFP network. For example, preferably the invention provides a method of handling running disparity of the data upon entering and exiting the GFP network. Since the timer uses biphase-encoded data, it is always DC balanced; however, if there is a data error then the disparity will be incorrect. When this condition happens on most other industry standard protocols, it generates an error code that would be mapped into the 64B/65B frame; since no such error codes are defined for timer traffic, the preferred embodiment of this invention takes a different approach. With this embodiment, and with reference to FIG. 11 an existing GFP code, which corresponds to 8B/10B code violations is inserted into the 64B/65B frame at 1104. Furthermore, this error code is preferably inserted into a neutral disparity sequence which is not recognized as valid timer data or control words, and preferably different codewords are used depending on the beginning running disparity; for example, the code word 001111 0001 can be used to represent negative initial disparity when the error occurred, and the code word 110000 1110 can be used to represent positive initial disparity. These codes are preferably recognized by the GFP mapper embedded in the WDM equipment. When the data exits from the GFP mapper at the other end of the network, this error condition is decoded and recognized as an 8B/10B code error, which would be handled transparently by the remote server or timer. As an alternate embodiment, the decoded error condition could be recognized as a timer protocol specific error.

Figure 11:
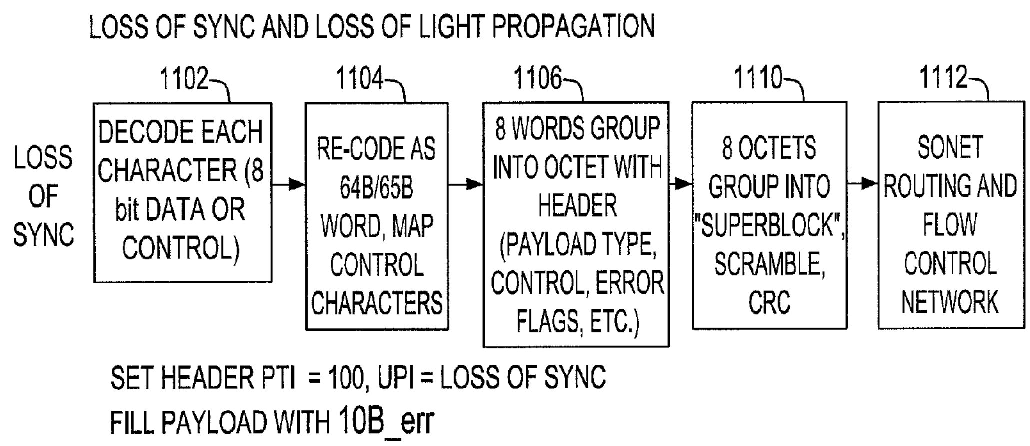
FIG. 11 shows a procedure for inserting an existing GFP code into a 64B/65B frame.

FIG. 11 shows, at 1102, each character is decoded; and at 1104, recoded as 64B165B word, map control. At 1106, eight words are grouped into an outlet with header (payload type, control, error flags, etc.). At 110, eight outlets are grouped into a superblock, scramble, CRC; and at 1112, SONET routing and flow control network.

Figure 12:
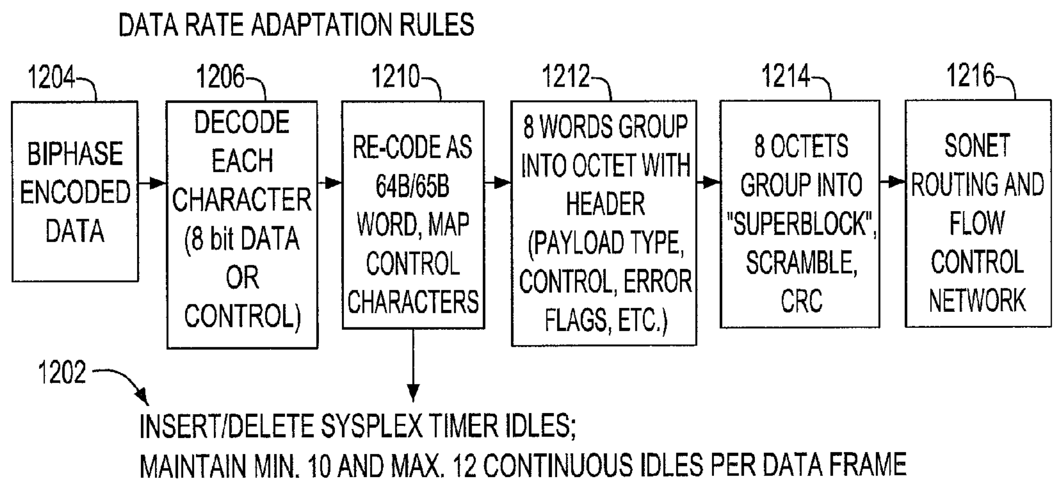
FIG. 12 depicts a method for addressing data rate adaption.

Another issue addressed by this invention is data rate adaptation for timer signals encapsulated using GFP. With reference to FIG. 12, when timer data enters the GFP mapper, rate adaptation occurs during the 64/65 encoding process. Fixed length GFP frames are used, padded with the GFP idle character, which is later removed by the de-mapper as the data exits the network. Data rate adaptation is facilitated by protocol specific rules governing the inter-packet gap (IPG); in this case, the invention, as represented at 1202, preferably specifies the minimum and maximum number of timer idle characters, which must be inserted between two data words. The GFP mapping can then preserve all of the inbound data, control, and IPG information when recoding to 64B/65B blocks. In the case of timer data, for example, a minimum of 10 timer idle characters and a maximum of 12 timer idle characters may be maintained for GFP rate adaptation (this design allows some extra margin, as the servers should be able to function with a minimum of 8 idle characters).

FIG. 12 shows biphase-encoded data at 1204. At 1206, each character is decoded; and at 1210, re-coded as 64B/65B word, map control characters. At 1212, eight words are grouped into outlet with header (payload type, control, error flags, etc.). At 1214, eight outlets are grouped into a "superblock," scramble, CRC; and at 1216 SONET routing and flow control network.

Further, in the preferred embodiment of the invention, timer idle characters may be inserted or removed one at a time. It will not be permitted, for example, to insert or remove idles which occur within 8 frames of a control frame carrying timer clock rate information (this is to facilitate recognition of the control frame). The 64B/65B encoded data is then mapped into GFP frames which are padded with GFP idle characters, management, or control frames inserted between GFP data frames, in order to rate adapt to the higher bandwidth SONET transport channel. Note that in some cases, there will be timer protocol specific signal failures, which need to be handled (for example, loss of light on the GFP network input). When this occurs, it may become necessary to generate a continuous stream of 8B/10B error messages at the output of the GFP network; rate adaptation must still be performed on this sequence, so, for example, any 8B/10B neutral disparity error character may be inserted or deleted after 10 consecutive error characters have been received and retransmitted.

Further, in the preferred embodiment, the invention provides means to propagate loss of signal (also called loss of light) on the timer interface; this is done in order to prevent data integrity problems. GFP mapping includes a "client signal fail" indication, or CSF, which may be used to propagate these conditions over the GFP network. For example, setting UPI=0000 0001 will indicate loss of signal, and setting UPI=0000 0010 will indicate loss of character sync. Both of these states are known as "client signal fail" or CSF events. If a CSF event occurs within a GFP data frame, then, for example, for a timer signal the remainder of the 64/65 block encoding is filled with 8B/10B error codes, which are decoded as data errors by the server or timer at the exit of the GFP network. This is intended to force the remote server or timer into a loss of sync condition with appropriate error handling. If this condition persists for more than, for example, 1.048576 microseconds (the ETR/CLO timeout interval), or if loss of light is detected, then preferably the inbound GFP mapper will propagate this condition using the corresponding UPI code and the outbound GFP mapper will force a loss of signal condition and associated recovery actions at the downstream server.

Figure 13:
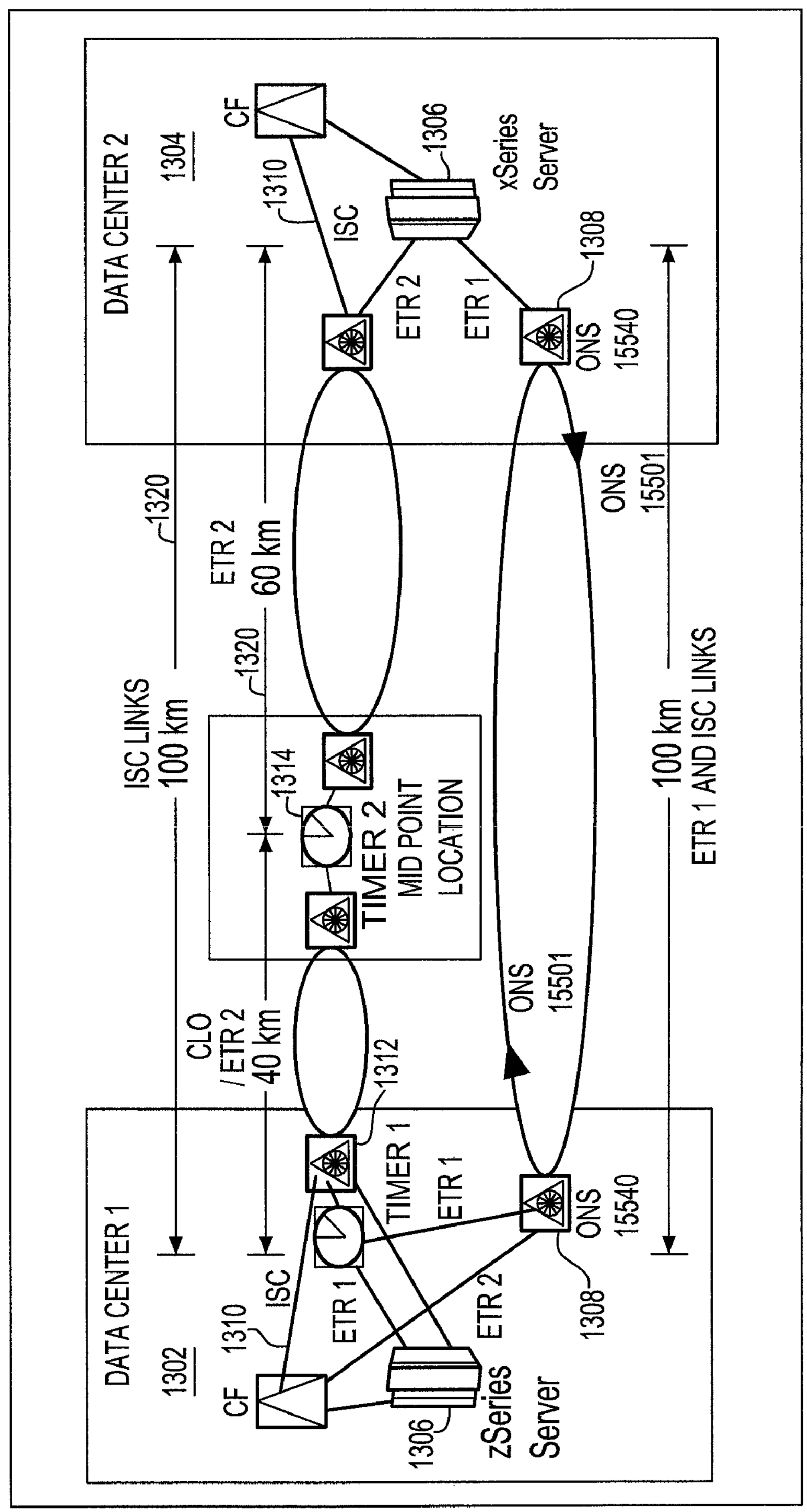
FIG. 13 shows the use of the present invention to transmit timer protocols between two data centers.

The preferred embodiment of the invention, described above in detail, provides a number of important advantages. One significant advantage, for example, is that the invention extends the distance between data centers. Extending the various links in a sysplex over long distances is usually accomplished with some form of channel extension equipment or optical wavelength division multiplexing (WDM). This may be implemented, for example, in various types of networking equipment collectively known as optical network service (ONS) platforms), which are available from various companies including Cisco, Nortel, and Lucent. For example, FIG. 13 shows two data centers 1302 and 1304, each having a server 1306, an ONS 1308 and an ISC 1310. FIG. 13 also shows a Timer 1312 at data center 1302 and a Timer 1314 at a location between the data centers 1302 and 1304. With the present invention, the timer protocols can be effectively transmitted up to 100 km using ISC links 1320. This, in turn, allows the data centers 1302 and 1304 to be located up to 100 km apart.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of enabling the transport of timer protocols using a generic frame procedure (GFP) network, said timer protocols including a defined optical initialization sequence, the method comprising the steps of:

transmitting said defined optical initialization sequence to a GFP mapper, said defined optical initialization sequence comprising a defined optical pulse and a specified clock rate; and said GFP mapper detecting said defined optical pulse of said optical initialization sequence and generating a specified GFP frame to represent said initialization sequence having said defined optical pulse, said specified GFP frame being recognized by the GFP network as a control frame for timer initialization, including the GFP mapper mapping the specified clock rate in the optical initialization sequence to the specified GFP frame by identifying the specified clock rate in the optical initialization sequence, using a look-up table to convert the specified clock rate to a GFP code identifying said specified clock rate, and inserting said GFP code into said specified GFP frame.

2. A method according to claim 1, wherein said timer protocol uses biphase encoding to encode clock data, and the method comprises the further steps of recovering clock data from a data stream that uses said biphase encoding;

detecting a clock rate in said data stream; and using a look up table to map said detected clock rate into a specific code for said control frame.

3. A method according to claim 2, comprising the further step of using a defined GFP frame to designate a change in said clock rate.

4. A method according to claim 3, comprising the further steps of:

transmitting the defined GFP frame to a recipient GFP mapper; and said recipient mapper using a look up table to determine a desired clock frequency based on said defined GFP frame.

5. A method according to claim 1, comprising the further steps of:

transmitting said specified GFP frame across a GFP network; and if there is a disparity of data upon entering and exiting the GFP network, inserting a defined codeword into the GFP frame.

6. A method according to claim 1, comprising the further step of inserting into the control frame a given number of timer idle characters to indicate data rate-adaptation.

7. A method according to claim 6, wherein the inserting step includes the step of inserting said timer idle characters one at a time.

8. The method according to claim 1, wherein the transmitting includes the GFP mapper determining the optical initialization sequence includes an optical pulse that matches a given optical pulse; and the generating the specified GFP frame includes the GFP mapper generating the specified GFP frame in response to the GFP mapper determining that the optical initialization sequence includes an optical pulse that matches the given optical pulse.

9. A system for enabling the transport of timer protocols over network using a generic frame procedure (GFP) network, said timer protocols including a defined optical initialization sequence, the system comprising:

a GFP mapper for mapping data into a GFP frame; and one or more processing units configured for transmitting said defined optical initialization sequence to said GFP mapper, said defined optical initialization sequence comprising a defined optical pulse and a specified clock rate, wherein said GFP mapper detects said defined optical pulse of said optical initialization sequence and generates a specified GFP frame to represent said initialization sequence having said defined optical pulse, said specified GFP frame being recognized by the GFP network as a control frame for timer initialization, including the GFP mapper mapping the specified clock rate in the optical initialization sequence to the specified GFP frame by identifying the specified clock rate in the optical initialization sequence, using a look-up table to convert the specified clock rate to a GFP code identifying said specified clock rate, and inserting said GFP code into said specified GFP frame.

10. A system according to claim 9, wherein said timer protocol uses biphase encoding to encode clock data, and the method further comprises:

recovering clock data from a data stream that uses said biphase encoding;

detecting a clock rate in said data stream;

using a look up table to map said detected clock rate into a specific code for said control frame.

11. A system according to claim 10, wherein a defined GFP frame is used to designate a change in said clock rate.

12. A system according to claim 11, wherein the defined GFP frame is transmitted to a recipient GFP mapper; and said recipient mapper uses a look up table to determine a desired clock frequency based on said defined GFP frame.

13. A system according to claim 9, wherein said method further comprises:

said specified GFP frame is transmitted across a GFP network; and a defined codeword is inserted into the GFP frame if there is a disparity of data upon entering and exiting the GFP network.

14. A system according to claim 9, wherein a given number of timer idle characters are inserted into the control frame, one character at a time, to indicate data rate adaption.

15. A program storage device readable by machine, tangibly embodying a program of instructions executable by the machine to perform method steps for enabling the transport of timer protocols over a generic frame procedure (GFP) network, said timer protocols including a defined optical initialization sequence, said method steps comprising:

transmitting said defined optical initialization sequence to a GFP mapper, said defined optical initialization sequence comprising a defined optical pulse and a specified clock rate; and said GFP mapper detecting said defined optical pulse of said optical initialization sequence and generating a specified GFP frame to represent said initialization sequence having said defined optical pulse, said specified GFP frame being recognized by the GFP network as a control frame for timer initialization, including the GFP mapper mapping the specified clock rate in the optical initialization sequence to the specified GFP frame by identifying the specified clock rate in the optical initialization sequence, using a look-up table to convert the specified clock rate to a GFP code identifying said specified clock rate, and inserting said GFP code into said specified GFP frame.

16. A program storage device according to claim 15, wherein said timer protocol uses biphase encoding to encode clock data, and the method steps further comprise:

recovering clock data from a data stream that uses said biphase encoding;

detecting a clock rate in said data stream; and using a look up table to map said detected clock rate into a specific code for said control frame.

17. A program storage device according to claim 16, wherein said method steps further comprise using a defined GFP frame to designate a change in said clock rate.

18. A program storage device according to claim 17, wherein said method steps further comprise:

transmitting the defined GFP frame to a recipient GFP mapper; and said recipient mapper using a look up table to determine a desired clock frequency based on said defined GFP frame.

19. A program storage device according to claim 15, wherein said method steps further comprise inserting into the control frame a given number of timer idle characters, one character at a time, to indicate data rate-adaptation.

* * * * *